United States Patent
Harley et al.

(10) Patent No.: US 7,308,469 B2
(45) Date of Patent: Dec. 11, 2007

(54) METHOD FOR GENERATING SECURE ELLIPTIC CURVES USING AN ARITHMETIC-GEOMETRIC MEAN ITERATION

(76) Inventors: Robert Joseph Harley, 4 rue de l'Ermitage, Sevres (FR) 92310; Jean-Francois Mestre, 3 rue de l'Est, Paris (FR) 75020

(*) Notice: Subject to any disclaimer, the term of this patent is extended or adjusted under 35 U.S.C. 154(b) by 808 days.

(21) Appl. No.: 10/172,776

(22) Filed: Jun. 14, 2002
(Under 37 CFR 1.47)

(65) Prior Publication Data
US 2003/0072443 A1  Apr. 17, 2003

Related U.S. Application Data

(60) Provisional application No. 60/298,612, filed on Jun. 15, 2001.

(51) Int. Cl.
*G06F 7/38* (2006.01)
(52) U.S. Cl. .................................... 708/491
(58) Field of Classification Search .............. 708/491
See application file for complete search history.

(56) References Cited

U.S. PATENT DOCUMENTS

| | | | | |
|---|---|---|---|---|
| 4,200,770 A | * | 4/1980 | Hellman et al. | 380/30 |
| 4,405,829 A | * | 9/1983 | Rivest et al. | 380/30 |
| 5,272,755 A | * | 12/1993 | Miyaji et al. | 380/30 |
| 5,351,297 A | * | 9/1994 | Miyaji et al. | 380/28 |
| 5,497,423 A | * | 3/1996 | Miyaji | 380/30 |
| 6,141,420 A | * | 10/2000 | Vanstone et al. | 380/30 |
| 6,480,605 B1 | * | 11/2002 | Uchiyama et al. | 380/30 |
| 6,985,890 B2 | * | 1/2006 | Inokuchi | 706/46 |
| 2004/0158597 A1 | * | 8/2004 | Ye et al. | 708/492 |

OTHER PUBLICATIONS

Mestre, Jean-Francois, Utilisation de I'AGM pour le calcul de $E(F_{2n})$, published letter, 2 pages, www.math.jussieu.fr/˜mestre, Paris, France.

Mestre, Jean-Francois, Utilisation de I'AGM pour le calcul de $E(F_{2n})$, published letter, 2 pages, www.math.jussieu.fr/˜mestre, Paris, France, no publication date.

* cited by examiner

*Primary Examiner*—Tan V. Mai
(74) *Attorney, Agent, or Firm*—Townsend and Townsend and Crew LLP

(57) ABSTRACT

Methods for determining whether an arbitrary elliptic curve over a binary field is secure, by using a novel non-converging Arithmetic-Geometric Mean iteration to determine the exact number of points on the curve. The methods provide rapid generation of secure curves for Elliptic-Curve Cryptography by selecting a secure curve from among candidate curves with the new method. The secure curve chosen is a curve whose number of points, is found to be divisible by a large prime number. The number of points on candidate curves is computed by a first phase, which lifts the curve to a certain related curve, followed by a second phase, which computes a certain norm that yields the result. The new Arithmetic-Geometric Mean iteration is used for the lifting phase or for the norm phase or for both.

9 Claims, 2 Drawing Sheets

METHOD FOR GENERATING SECURE ELLIPTIC CURVES USING AN ARITHMETIC-GEOMETRIC MEAN ITERATION

CROSS-REFERENCES TO RELATED APPLICATIONS

This application claims priority from co-pending U.S. Provisional Patent Application No. 60/298,612 filed Jun. 15, 2001 entitled METHOD FOR GENERATING SECURE ELLIPTIC CURVES USING AN ARITHMETIC-GEOMETRIC MEAN ITERATION which is hereby incorporated by reference, as if set forth in full in this document, for all purposes.

BACKGROUND OF THE INVENTION

Field of Invention

The present invention relates to elliptic-curve cryptography (ECC) and, more particularly, to the fast generation of secure elliptic curves over binary fields.

Since Elliptic-Curve Cryptography (ECC) was proposed in the mid-1980s by Koblitz [Kob1987] and Miller [Mil1987] following the work of Lenstra [Len1987], its security and efficiency have been subject to intense study. In recent years, it has become widely accepted as an alternative to cryptosystems based on factorization or discretelogarithms in finite fields, especially for constrained environments. ECC is now covered by standards from such bodies as ANSI, IEEE, ISO and NIST. See [ANSI1999], [IEEE2000], [ISO1998] and [NIST2000].

One of the initial steps in protocols based on ECC is to pick a suitable curve. In public-key ECC, public and private keys typically contain information identifying such a curve along with certain other data such as a point on it. To ensure that the ECC system is secure, the curve must be chosen to have a number of points which is divisibly a large prime number in order to ensure that the curve is not vulnerable to known generic methods of attack. To check this, it is necessary to know the exact number of points on the curve.

Some special elliptic curves have particular properties which make computing the number of points on them easy, or which accelerate arithmetic operations occurring in cryptographic protocols. However such special curves have repeatedly been found to be vulnerable to specific methods of attack.

The most striking example is curves of trace one for which polynomial time attacks were discovered independently by Smart [Sma1999], Satoh-Araki [SA1998] and Semaev [Sem1998]. Supersingular curves and curves of trace two were broken in sub-exponential time by Menezes, Okamoto and Vanstone [MOV1991] and by Frey and Ruck [FR1994]. Curves with many automorphisms. These include curves defined over small fields as proposed by Koblitz, and some complex-multiplication curves (see U.S. Pat. Nos. 5,272,755, 5,351,297 and 5,497,423.) are vulnerable to exponential-time attacks which are faster than generic attacks, see [Har1998], [WZ1998], [GLV1998] and DGM1999].

Gaudry, Hess and Smart [GHS2000] have shown that some curves defined over composite extension fields are also weak. Thus in order to ensure security, the base field should be chosen to be a prime field or an extension of prime degree.

These results suggest that to maximize security one must avoid choosing curves from particular families of curves with special properties or extra structure and instead examine arbitrary candidate curves, ideally chosen at random, to find one whose number of points is divisible by a large prime number. This procedure first became feasible with the SEA method for point-counting due to Schoof [Sch1985], [Sch1995], Elkies [Elk1998] and Atkin [Atk1988]. If desired, one may also check that the resulting curve does not accidentally fall into a known family of vulnerable curves (a very rare occurrence).

Finding such a secure curve requires testing many candidates. Candidate curves may be prefiltered by rejecting some whose numbers of points can be determined in advance to be divisible by certain small divisors, as done by Lercier in [Ler1997]. However even with this strategy, finding secure curves using the SEA method was a slow process. Johnson and Menezes [JM1999] recently described it as a "complicated and cumbersome task" requiring "a few hours on a workstation" for 200 bits.

It was possible to work around this difficulty to a certain extent by precomputing a limited number of secure curves in advance and then deploying those curves widely. For instance, this is common practice with several of the curves described by the U.S. National Institute of Standards and Technology [NIST2000]. However such a practice is deemed risky by experts [INRIA2000], in part because of the actual choice of curves and in part because any discovery of methods of attack against a widely-deployed curve would have widespread implications.

An ability to generate new secure elliptic curves is deemed to be highly desirable. For instance in U.S. Pat. No. 6,141,420, Vanstone, et al. write:

"The elliptic curve cryptography method has a number of benefits. First, each person can define his own elliptic curve for encryption and decryption, which gives rise to increased security. If the private key security is compromised, the elliptic curve can be easily redefined and new public and private keys can be generated to return to a secure system. In addition, to decrypt data encoded with the method, only the parameters for the elliptic curve and the session key need be transmitted."

While in theory it is easy to incorporate a new curve into an ECC system, in practice it remained difficult to generate new secure curves dynamically. Recently a partial solution to this problem was provided by Satoh's method for point-counting [Sat2000] and by Fouquet, Gaudry and Harley's extension of it to the practically useful case of binary fields, see [FGH2000] and also [Skj2000], [UPU2001]. This allowed secure curves to be generated more rapidly than had been done previously [FGH2001].

The present invention comprises a new Arithmetic-Geometric Mean (AGM) method for point-counting which is significantly faster than those in the prior art and allows secure curves to be generated very quickly so that, for instance, this can be done at will by users of ECC systems. For instance a secure 163-bit curve, whose number of points is two times a prime number, can presently be generated in two seconds on average using a certain workstation (Alpha, 750 MHz) and a 239-bit curve takes eight seconds. Furthermore the new method can be implemented with a small amount of program memory and of random-access memory so that it is suitable for constrained devices such as a Personal Digital Assistant or mobile telephone.

Note that several applications of converging AGM iterations are known in the art for use with non-binary fields (see [HM1989]) whereas the present invention involves a non-converging iteration for use with binary fields. Note also that the present method can be extended to some hyperelliptic curves by combining it with ideas described in [BM1988].

A particular advantage of the new method for environments with high security requirements, is that it is now practical to generate secure curves locally and never reveal them to third parties. For instance communicating parties may initially share a secret curve, or each of them may generate the same shared secret curve by selecting it from a pseudo-random sequence initialized with a seed value which is a shared secret constructed using a standard protocol such as Diffie-Hellman (U.S. Pat. No. 4,200,770). With ECC techniques based on publicly known curves, an eavesdropper who listens in on ECC transactions can attempt to attack them by using certain computations on the curves. However an eavesdropper who does not even know which curve is used for a particular transaction will have no such avenue of attack. One of the principal advantages of ECC over competing cryptosystems such as Rivest-Shamir-Adleman (U.S. Pat. No. 4,405,829) is that it draws high levels of security from much smaller keys. With the technique just described, security is further enhanced while maintaining small keys.

BRIEF SUMMARY OF THE INVENTION

An object of the present invention is to provide a new method for determining the exact number of points on an arbitrary elliptic curve defined over a binary field.

A second object of the present invention is to thereby enable the rapid generation of secure elliptic curves for use in elliptic-curve cryptography by making use of the new point-counting method.

A third object of the present invention is to ensure that the methods described herein be implementable in devices which may be constrained in the amount of program memory available or in the amount of random-access memory available or in the processing power available or some combination of these.

To these ends, the present invention provides a new method for point-counting which is significantly faster than prior art methods, while being efficient in terms of program size and memory usage. The new method comprises two phases:

The first phase, called lifting, consists of a procedure which takes as input a given elliptic curve over a binary field and, by certain techniques described below, produces as output a precise approximation of a certain related elliptic curve.

The second phase consists of a procedure which takes as input the lifted elliptic curve and computes, by certain techniques described below, the norm of a related quantity in such a way as to determine the number of points of the initially given curve.

The inventive steps of this new method, relative to methods known from prior art, include use of the AGM iteration in new techniques for implementing either or both of the above phases efficiently. Further details of the new method will become readily apparent from the detailed description below.

The new method can be embodied in several forms:

In one form, the first phase is implemented using the new AGM method described below and the second phase is implemented using any other means for norm computation, such as one existing in prior art.

In another form, the first phase is implemented using any standard means for curve lifting, such as one existing in prior art, and the second phase is implemented using the new AGM method described below.

In another form, both phases are implemented using the new AGM method described below.

In practice these forms may be embodied as program code such as a C language program running on a general purpose microprocessor (as is the case for existing prototypes at the time of filing). Another envisaged embodiment is as a program running on a constrained device such as a smart-card chip. Another envisaged embodiment is a hardware design, either a dedicated design implementing the entire method or a design providing hardware assistance for some critical portions of it.

The result of a process using the new present invention is the number of points on a given elliptic curve. It takes the tangible form of an integer value stored in registers or memory cells of a device carrying out the process.

To generate a secure curve quickly, the present invention is applied repeatedly to a sequence of candidate curves. The candidates may optionally be prefiltered using an early-abort strategy such as one of those known from prior art. A brief outline is given next for purposes of exposition. Some details are omitted as being analogous to details known in the art for use with other point-counting methods. See [Ler1997], [MP1998] or [FGH2001].

A sequence of candidate curves over a binary field is generated by any appropriate means, such as by choosing curves randomly or pseudo-randomly.

An early-abort strategy may be applied to select from this sequence a sub-sequence of curves with improved likelihood of being secure. To do this, some of the curves which are not secure are filtered out by determining that their numbers of points are divisible by certain small divisors.

The numbers of points on the selected curves are computed with the new AGM method.

The number of points on each selected curve is checked to determine if it is divisible by a sufficiently large prime number for the curve to be deemed secure.

One may also check at any stage whether each curve falls into a known family of weak curves.

As a particular example, one may accept curves whose number of points is two times a large prime number (note that the number of points is always even). In such a case one could filter out curves whose number of points is divisible by 4, 3, 5 or 7 before applying the new AGM method for point-counting.

Various modifications will occur to those skilled in the art. For instance one could also accept curves whose number of points is four times a large prime number. In such a case, pairs consisting of curves and their twisted curves may be handled simultaneously as described in [MP1998].

The final result of a process for generating secure elliptic curves using the new AGM method is one or more coefficients defining the curve. These coefficients take the tangible form of bit-string values stored in registers or memory cells of a device carrying out the process.

In one embodiment the invention provides a method for generating a cryptographic key for use in a digital processing system, the method comprising analyzing points on an elliptic curve by using a non-converging arithmetic geometric mean calculation; and deriving a cryptographic key from the analysis.

The foregoing and other features and advantages of the present invention will become apparent from the detailed description given below.

DETAILED DESCRIPTION OF THE INVENTION

The present invention provides a new method for determining the exact number of points on an arbitrary elliptic curve defined over a binary field i.e., a finite field of characteristic two. The following describes preferred embodiments of this method.

Several abstract structures are defined for the purposes of exposition. However they each have a concrete representation in a device implementing the invention.

Define Z.sub.2 (the symbol sub. denotes a subscript) to be the ring of 2-adic integers i.e., normal integers considered modulo successive powers of two. Define f(x) to be a polynomial of degree d with coefficients in Z.sub.2 that has it's leading coefficient equal to one and that is irreducible modulo 2. Let q be 2 ^d (the symbol ^ denotes taking a power). Define Z.sub.q to be the ring of polynomials over Z.sub.2 considered modulo f(x). Note that Z.sub.q is of characteristic zero.

Concretely, elements in Z.sub.2 and in Z.sub.q are represented to some working precision in a device implementing the invention. An element in Z.sub.2 is represented to precision n by storing the first n bits of its value in an array of n bits in the natural way. An element in Z.sub.q is represented to precision n by storing it's coefficients in an array of d elements, each of which is an element in Z.sub.2 to precision n. For efficiency purposes, f(x) can be chosen to be sparse, for instance having 3 or 5 coefficients equal to one and the others all equal to zero. Other representations are clearly possible.

Define F.sub.q to be the binary field of q elements with the representation that follows naturally by considering Z.sub.q modulo 2. Further details relating to representation issues and similar are omitted, as they are conventional and well known in the art.

As is usual, the equation of an ordinary elliptic curve over the binary field F.sub.q can be put into the form:

$$y^2+x^*y=x^3+c$$

with coefficient c in F.sub.q, by taking the quadratic twist of the curve if necessary.

The input to the new AGM method of point-counting is the coefficient c specifying an ordinary elliptic curve. The new method makes use of the following steps. It employs variables A, B, C and T, which are in Z.sub.q, to a certain working precision. Working to precision ((d+1).div. 2)+4 is sufficient (the symbol .div. denotes truncated division).

The arithmetic operations employed below operate modulo f(x) so that they are significantly more complicated than ordinary numerical operations, however methods for computing them are well known in the art.

Figure 1:
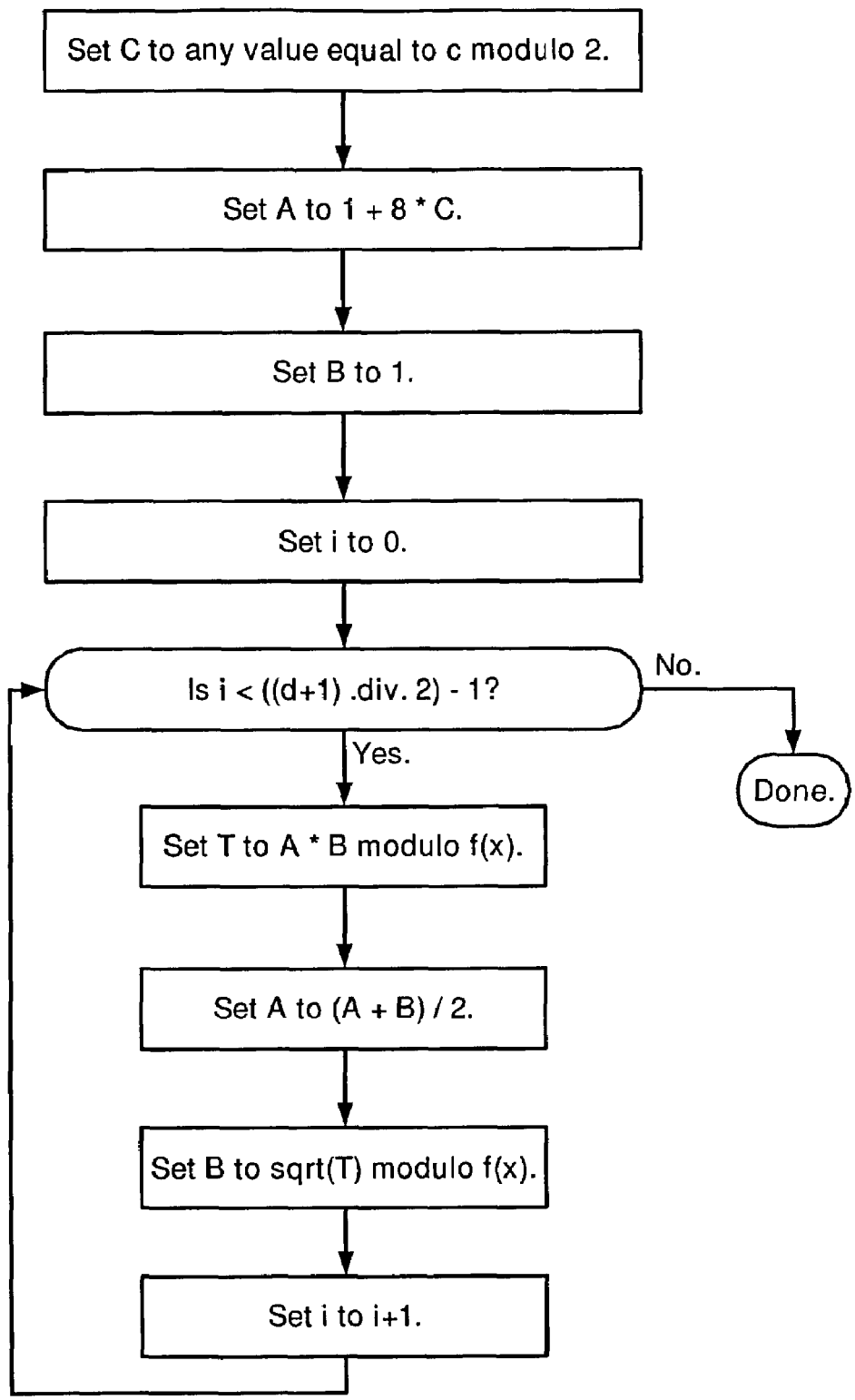
FIG. 1 is a flowchart of a sequence of steps in a first phase of computation.

The first phase computes a lifted curve as illustrated in FIG. 1 and as follows:
1. Variable C is chosen to be any value that coincides with c, modulo 2. This is done by simply filling in arbitrary bits.
2. Variable A is set to the initial value 1+8*C.
3. Variable B is set to the initial value 1.
4. The following steps are repeated in a loop ((d+1).div. 2)−1 times:
   4a. Variable T is set to the product A*B modulo f(x).
   4b. Variable A is set to the value (A+B)/2.
   4c. Variable B is set to the square root of T modulo f(x).
   (end of loop)

The initialization in step 2 can be made more accurate, for instance by setting A to 1+8+C^8−32*C^16. In step 4c, there is a choice of sign to be made in the square root. The sign should be chosen to ensure that B remains equal to 1 modulo 4. Then it may be observed that the values of A and B both remain equal to 1 modulo 4 and remain equal to each other modulo 8.

Note that each loop iteration in step 4 computes the arithmetic and geometric means of A and B, but unlike other known applications of the AGM iteration, the values of A and B do not converge to a single value.

Steps 1 to 4 constitute the first phase of the point-counting algorithm. The output is the elliptic curve over Z.sub.q given by the following equation:

$$y^2=x^*(x-A^2)^*(x-B^2)$$

which is the canonical lift of the initially given curve, or else a conjugate of this lift. To improve efficiency in this phase, the working precision can initially be small, say 5 bits, and be gradually increased by one bit per loop iteration.

Note that in one form of the present invention, this first phase can be replaced by a different method for lifting, including those described in such prior art as reference [Sat2000]. In such a case, the lifted curve can be given by an equation above and the second phase is done with the AGM.

Figure 2:
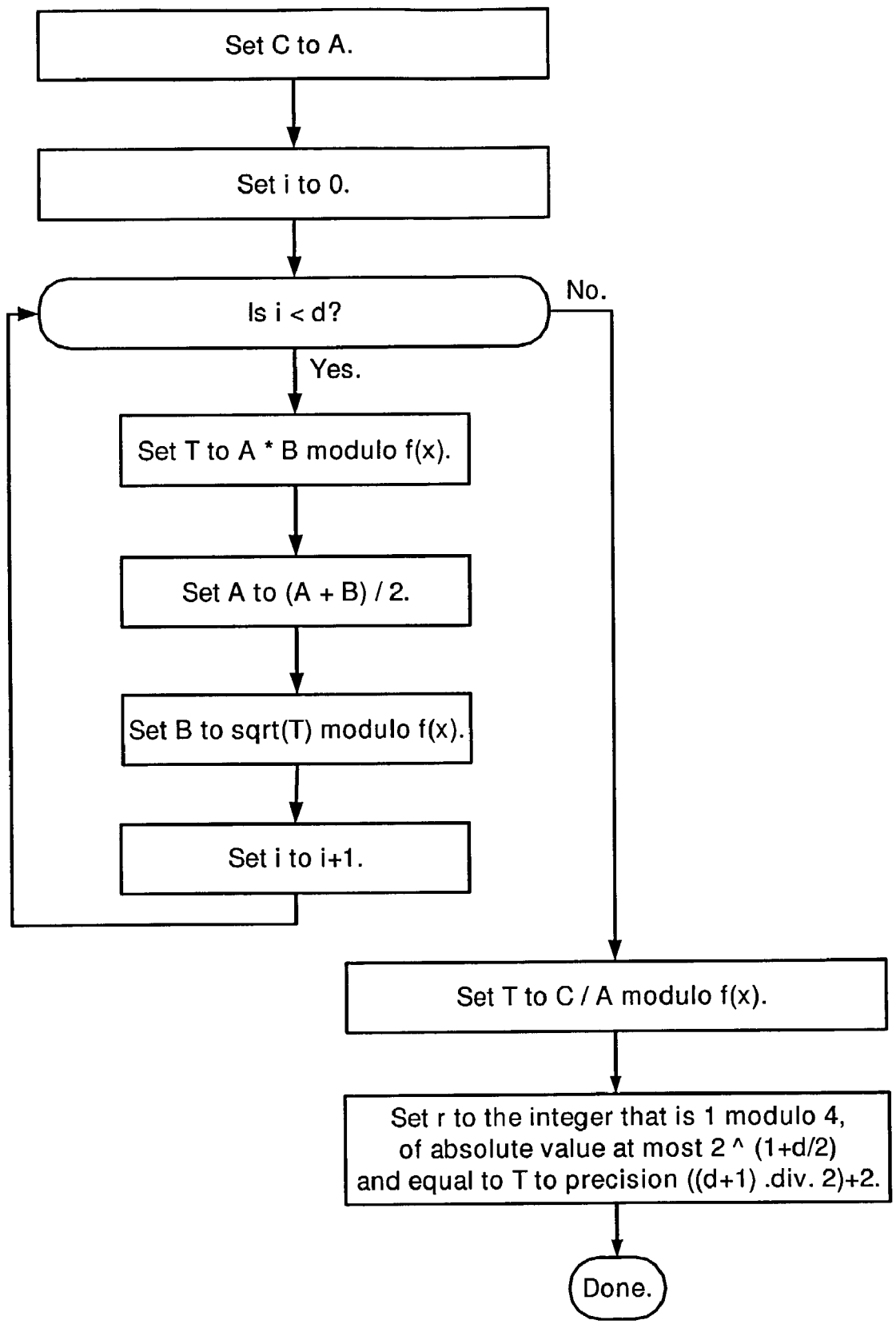
FIG. 2 is a flowchart of a sequence of steps in a second phase of computation.

The second phase is illustrated in FIG. 2 and as follows.
5. Variable C is set to A.
6. The following steps are repeated in a loop d times:
   6a. Variable T is set to the product A*B modulo f(x).
   6b. Variable A is set to the value (A+B)/2.
   6c. Variable B is set to the square root of T modulo f(x).
   (end of loop)
7. Variable T is set to C/A modulo f(x).
   (Note that T will then be found to be an element in Z.sub.2).
8. Integer variable r is set to the unique integer with absolute value at most 2^(1+d/2), and equal to 1 modulo 4 and equal to T to precision ((d+1).div. 2)+2.

The final output is q+1−r, which is the number of points on the given curve including the point at infinity. In cases where the number of points on the twisted curve is desired instead, the output is to be replaced by q+1+r.

Steps 5 to 8 constitute the second phase of the point-counting algorithm. Steps 5 to 7 compute the norm of the value that C/A would have after the first iteration of loop 6. Then step 8 computes the exact value of the trace of the curve.

Note that in one form of the present invention the first phase is done with the AGM, and this second phase can be replaced by a different method for computing this norm, such as one existing in prior art or the method very recently described by Professor Satoh in [Sat2001].

While the present invention has been described in connection with a specific embodiment, various modifications will occur to those skilled in the art without departing from the spirit of what is described herein.

Certain specific steps may be replaced by steps that can be seen to be equivalent by those skilled in the art, and such equivalent steps are also implied. For example, the two-variable AGM iterations described above can easily be replaced with one-variable iterations of the form: Set S to (1+S)/2 divided by the square root of S.

Table I, below, lists various references referred to in this specification as follows:

TABLE I

[ANSI1999]:

American National Standards Institute.
"Public Key Cryptography for the Financial Services Industry: The Elliptic Curve Digital Signature Algorithm."
ANSI X9.62 (1999).
[Atk1992]:

A. Oliver L. Atkin.
"The number of points on an elliptic curve modulo a prime."
NMBRTHRY mailing list (1992).
Archived at http://listserv.nodak.edu/scripts/wa.exe?A0=nmbrthry
[BM1988]:

Jean-Benoit Bost, Jean-Francois Mestre
"Moyenne arithme'tico-ge'ometrique et pe'riodes des courbes de genre 1 et 2."
Gazette des Mathematiciens.
Vol. 38 (1998), pp. 36-64.
[DGM1999]:

Ivan Duursma, Pierrick Gaudry, Franc,ois Morain.
"Speeding up the discrete log computation on curves with automorphisms."
In: Advances in Cryptology-ASIACRYPT '99.
Lecture Notes in Computer Science Vol. 1716 (1999), pp. 103-121.
[GLV1998]:

Robert Gallant, Robert Lambert, Scott A. Vanstone.
"Improving the parallelized Pollard lambda search on binary anomalous curves." (1998).
To appear in Mathematics of Computation.
[Elk1998]:

Noam Elkies.
"Elliptic and modular curves over finite fields and related computational issues."
Computational Perspectives on Number Theory.
AMS/International Press (1998), pp. 21-76.
[FGH2000]:

Mireille Fouquet, Pierrick Gaudry, Robert Harley.
"An extension of Satoh's algorithm and its implementation."
Journal of the Ramanujan Mathematical Society.
Vol. 15 (2000), pp. 281-318.
[FGH2001]:

Mireille Fouquet, Pierrick Gaudry, Robert Harley
"Finding Secure Curves with the Satoh-FGH Algorithm and an Early-Abort Strategy."
In: Advances in Cryptology-Eurocrypt 2001.
Lecture Notes in Computer Science Vol. 2045 (2001), pp. 14-29.
[FR1994]:

Gerhard Frey, Hans-Georg Ru"ck.
"A remark concerning m-divisibility and the discrete logarithm in the divisor class group of curves."
Mathematics of Computation.
Vol. 62, #206 (1994), pp. 865-874.
[GHS2000]:

Pierrick Gaudry, Florian Hess, Nigel P. Smart.
"Constructive and destructive facets of Weil descent on elliptic curves."
Technical Report CSTR-00-016, University of Bristol (2000).
[Har1998]:

Robert Harley.
"Elliptic Curve Discrete Logarithms Project, ECC2K-95."
(1998).
Available at http://cristal.inria.fr/~harley/ecdl/

TABLE I-continued

[HM1989]:

Guy Henniart, Jean-Franc,ois Mestre.
"Moyenne arithme'tico-ge'ometrique p-adique."
Comptes Rendus Acad. Sci. Paris
Vol. 308 (1989), pp. 391-395
[IEEE2000]:

Institute of Electrical and Electronics Engineers.
"Standard Specification for Public-Key Cryptography"
IEEE P1363 (2000).
[INRIA2000]:

Institut National de Recherche en Informatique et en Automatique.
"Biggest public-key crypto crack ever-INRIA leads worldwide Internet-distributed calculation."
INRIA press release (2000).
Available at http://www.inria.fr/presse/pre67.en.html
[ISO1998]:

"Information Technology--Security Techniques-Digital Signatures with Appendix-Part 3: Certificate Based-Mechanisms"
ISO/IEC 14888-3 (1998).
[JM1999]:

Don Johnson, Alfred J. Menezes.
"The elliptic curve digital signature algorithm (ECDSA)."
Technical Report CORR 99-34, University of Waterloo, (1999).
[Kob1987]:

Neal Koblitz.
"Elliptic curve cryptosystems."
Mathematics of Computation.
Vol. 48, #177 (1987), pp. 203-209.
[Len1987]:

Hendrik W. Lenstra Jr.
"Factoring integers with elliptic curves."
Annals of Mathematics.
Vol. 126 (1987), pp. 649-673.
[Ler1997]:

Reynald Lercier.
"Finding good random elliptic curves for cryptosystems defined over $F\_\{2^n\}$."
In: Advances in Cryptology-EUROCRYPT '97.
Lecture Notes in Computer Science Vol. 1233 (1997), pp. 379-392.
[Mill1987]:

Victor S. Miller.
"Use of elliptic curves in cryptography."
In: Advances in Cryptology-CRYPTO '86,
Lecture Notes in Computer Science Vol. 263 (1987), pp. 417-426.
[MOV1991]:

Alfred J. Menezes, Tatsuaki Okamoto, and Scott A. Vanstone.
"Reducing elliptic curves logarithms to logarithms in a finite field."
In: Proceedings 23rd Annual ACM Symposium on Theory of Computing.
ACM Press (1991), pp. 80-89.
[MP1998]:

Volker Mu"ller, Sachar Paulus.
"On the Generation of Cryptographically Strong Elliptic Curves."
Preprint (1998).
Available at http://www.informatik.th-darmstadt.de/TI/Mitarbeiter/vmueller.html
[NIST2000]:

National Institute of Standards and Technology.
"Digital Signature Standard".
FIPS 186-2 (2000).
[SA1998]:

Takakazu Satoh, Kiyomichi Araki.
"Fermat quotients and the polynomial time discrete log algorithm for anomalous elliptic curves."
Commentarii Mathematici Universitatis Sancti Pauli.
Vol. 47 (1998), pp. 81-92.

TABLE I-continued

[Sat2000]:

Takakazu Satoh.
"The canonical lift of an ordinary elliptic curve over a finite field and its point counting."
Journal of the Ramanujan Mathematical Society.
Vol. 15 (2000) , pp. 247-270.
[Sat2001]:

Takakazu Satoh.
"Asymptotically Fast Algorithm for Computing the Frobenius Substitution and Norm over Unramified Extension of p-adic Number Fields."
Preprint available from Saitama University, Japan.
[Sch1985]:

Rene' Schoof.
"Elliptic curves over finite fields and the computation of square roots mod p."
Mathematics of Computation.
Vol. 44 (1985), pp. 483-494.
[Sch1995]:

Rene' Schoof.
"Counting points on elliptic curves over finite fields."
Journal de The'orie des Nombres de Bordeaux.
Vol. 7 (1995), pp. 219-254.
[Sem1998]:

Igor A. Semaev.
"Evaluation of discrete logarithms in a group of p-torsion points of an elliptic curve in characteristic p."
Mathematics of Computation.
Vol. 67, #221 (1998), pp. 353-356.
[Skj2000]:

Berit Skjernaa.
"Satoh's algorithm in characteristic 2."
(2000). To appear.
Copies available at http://www.imf.au.dk/~skjernaa/
[Sma1999]:

Nigel P. Smart.
"The discrete logarithm problem on elliptic curves of trace one."
Journal of Cryptology.
Vol. 12 (1999), pp. 193-196.
[VPV2001]:

Frederik Vercauteren, Bart Preneel, Joos Vandewalle.
"A Memory Efficient Version of Satoh's Algorithm."
In: Advances in Cryptology-Eurocrypt 2001.
Lecture Notes in Computer Science Vol. 2045 (2001), pp. 1-13.
[WZ1998]:

Michael J. Wiener, Robert J. Zuecherato.
"Faster Attacks on Elliptic Curve Cryptosystems."
Selected Areas in Cryptography '98
Lecture Notes in Computer Science Vol. 1556 (1998), pp. 190-200

The terms and expressions which have been employed here are used for purposes of description and not of limitation. There is no intention to exclude any equivalents of the various features shown and described. It should be understood that various modifications are possible within the scope of the invention. For example, steps in the flowcharts of FIGS. 1 and 2 merely show one selection of basic steps for achieving the invention. Steps can be added to, or taken from, those shown. Further, the steps shown can be modified. In general, many approaches to achieving the functionality of the invention are possible.

Any suitable programming language or technique can be used. For example, object oriented, procedural, artificial intelligence, etc., techniques can be adopted. The steps can be performed serially or concurrently. The methods and aspects of the present invention can be practiced in a general-purpose computing environment or with distributed, parallel, co-processing, embedded, etc. architectures. Aspects of the invention need not be embodied in reprogrammable media. steps or functions described herein can be performed in hardware, software or a combination of the two. For example, hardware design can include application-specific integrated circuits (ASICs), field-programmable gate arrays (FPGAs), custom or semi custom designs, discrete logic, etc.

It is possible that the present invention can be practiced in other than electrical devices. For example, optical, biotechnology, nanoengineering, etc., devices can be employed.

Thus the scope of the invention is to be determined solely by the appended claims.

What is claimed is:

1. A method for computing the number of points on an elliptic curve E over a binary field of degree d, comprising the following two steps in which an arithmetic-geometric mean iteration is used for at least one of the steps
    a) lifting said given curve E from the binary field to a precise approximation of it's lifted curve F,
    b) computing the number of points on said given curve E by computing a norm from said lifted curve F; and
    c) generating a cryptographic key using the computed number of points.

2. The method of claim 1 wherein said lifting is computed by a one-variable arithmetic-geometric mean iteration comprising the steps of
    a) representing the given curve E in the form $y^2+x*y=x^3+C$ with C in characteristic zero,
    b) initializing variable S to the value $1+8*C$,
    c) in a loop, replacing said variable S by the mean $(1+S)/2/\sqrt{S}$, thereby yielding a lifted curve F of the form $y^2=x*(x-1)*(x-S^2)$.

3. The method of claim 1 wherein said lifting is computed by a two-variable arithmetic-geometric mean iteration comprising the steps of
    a) representing the given curve E in the form $y^2+x*y=x^3+C$ with C in characteristic zero,
    b) initializing variables A and B to the values $1+8*C$ and 1 respectively,
    c) in a loop, replacing said variables A and B by their arithmetic and geometric means respectively, thereby yielding a lifted curve F of the form $y^2=x*(x-A^2)*(x-B^2)$.

4. The method of claim 2 or claim 3 in which the number of rounds of the looping step is at least $((d+1).\text{div. }2)-1$.

5. The method of claim 4 in which a more accurate initialization step is performed and in which the number of rounds of the looping step is correspondingly decreased.

6. The method of claim 1 wherein said norm computation is performed by a one-variable arithmetic-geometric mean iteration comprising the steps of
    a) representing the lifted curve F in the form $y^2=x*(x-1)*(x-S^2)$,
    b) initializing variable T to the value 1,
    c) in a loop with d rounds, replacing variable T by $T/\sqrt{S}$ and S by the mean $(1+S)/2/\sqrt{S}$, thereby yielding the number of points on the curve $2^d+1-r$ where r is the unique integer equal to 1 modulo 4 and with absolute value at most $2^{(1+d/2)}$ and equal to T to precision $((d+1). \text{div. } 2)+2$.

7. The method of claim 1 wherein said norm computation is performed by a two-variable arithmetic-geometric mean iteration comprising the steps of a) representing the lifted curve F in the form $y^2=x*(x-A^2)*(x-B^2)$,
b) storing the value of variable A in variable C,
c) in a ioop with d rounds, replacing variables A and B by their arithmetic and geometric means respectively,
d) setting variable T to C/A, thereby yielding the number of points on the curve $(2^d)+1-r$ where r is the unique integer equal to 1 modulo 4 and with absolute value at most $2^{(1+d/2)}$ and equal to T to precision ((d+1). div. 2)+2.

8. The method of claim 1, further comprising storing the computed number of points in a memory.

9. The method of claim 8, wherein the memory is one of a set of registers or memory cells in a computing device.

* * * * *